(12) United States Patent
Cederblad

(10) Patent No.: US 6,280,676 B1
(45) Date of Patent: Aug. 28, 2001

(54) STRETCH MODIFIED ELASTOMERIC NETTING

(75) Inventor: Hans O. Cederblad, Minnetonka, MN (US)

(73) Assignee: Leucadia, Inc., New York, NY (US)

( * ) Notice: Subject to any disclaimer, the term of this patent is extended or adjusted under 35 U.S.C. 154(b) by 918 days.

(21) Appl. No.: 08/533,366

(22) Filed: Sep. 25, 1995

(51) Int. Cl.$^7$ ................................ B28B 11/08
(52) U.S. Cl. .................. 264/291; 264/DIG. 73
(58) Field of Search ............. 428/255; 264/291, 264/DIG. 73

(56) References Cited

U.S. PATENT DOCUMENTS

| 3,252,181 | 5/1966 | Hureau . | |
|---|---|---|---|
| 4,152,479 | 5/1979 | Larsen | 428/224 |
| 4,399,184 | 8/1983 | Nalle, Jr. | 428/255 |
| 4,469,738 | * 9/1984 | Himelreich, Jr. | 428/198 |
| 4,567,011 | 1/1986 | Nalle, Jr. | 264/504 |

FOREIGN PATENT DOCUMENTS

| 0 096 458 | 12/1983 | (EP) . |
| 0 301 599 | 1/1989 | (EP) . |
| WO 93/16870 | 9/1993 | (WO) . |

* cited by examiner

Primary Examiner—Terrel Morris
(74) Attorney, Agent, or Firm—Vidas, Arrett & Steinkraus, P.A.

(57) ABSTRACT

Extruded netting having at least some elastomeric strands, the properties of which have been modified by stretch conditioning.

3 Claims, 4 Drawing Sheets

STRETCH MODIFIED ELASTOMERIC NETTING

BACKGROUND OF THE INVENTION

This invention relates to extruded polymeric netting and more particularly to such netting in which at least some of the strands in at least one direction in the net, preferably all of the strands, are of an elastomeric polymeric material which may be stretch modified in accordance with this invention.

Extruded polymeric netting has been known and used for some time. U.S. Pat. No. 4,152,479 to Larsen and U.S. Pat. No. 3,252,181 to Hureau describe types of such net. These patents and their entire content are incorporated herein by reference. Extruded netting is netting in which the strands are extruded from a die, the joints therebetween being formed either within the die or immediately outside the lips of the die.

In the netting to which these patents relate, the extruded strands are comprised of orientable polymeric material. Orientation is a stretching process which can be applied to the net in the machine direction (MD) and/or the cross direction (CD) or transverse direction (TD). When oriented in only one direction, the net is said to be uniaxially oriented. When oriented in both directions it is said to be biaxially oriented.

The orientation process is applied to these types of net to significantly increase net size, both in width and length and to orient the molecules of the material in the strands from a random arrangement into a more ordered arrangement. Due to the nature of the polymeric material used heretofore in extruded netting, the net when stretched to a larger size remained essentially at the stretched or enlarged size. That is, such nets do not exhibit any significant recovery. The ordered arrangement obtained is desirable because it increases the strength to weight ratio of the net. Some of the more common materials used in such nets are polypropylene, nylon and linear low density and high density polyethylene.

It has recently become desirable to provide extruded net in which the strands or at least some of the strands in one direction or both directions are of elastomeric material in order to provide net exhibiting significant elasticity for a variety of purposes. One such net is described in co-pending application Ser. No. 08/295,635 entitled BICOMPONENT ELASTOMERIC NETTING which is assigned to the same assignee as is this invention. The content of this application is incorporated herein by reference.

Stretch orientation processing has not been applied to elastomeric net to modify elastic properties prior to this invention. It has not been believed that the orientation process would be useful with respect to extruded elastomeric nets since it does not provide the traditionally expected results and benefits.

In accordance with this invention, it has been discovered that stretching elastomeric strands in extruded netting produces beneficial modification of the elastic properties of the net. The invention most accurately is described herein as "stretch modification". The same equipment as is used for orientation may be used for stretch modification when modified to accommodate the greater stretch involved. Such equipment is described in the aforenoted Larsen patent. Stretch modification may take place at room temperature (RT) or at elevated temperatures, similar to the known orientation process.

SUMMARY OF THE INVENTION

Stretch modification of extruded elastomeric net allows the elasticity level of the net to be engineered to predetermined specification for any desired recovery. It also allows stretch to be engineered likewise. This is accomplished by stretching the net in the MD and or CD directions under controlled conditions.

Definition of Thermoplastic Elastomer

The ASTM D 1566-66T definition of the term "elastomer" is "a macromolecular material that returns rapidly to approximately the initial dimensions and shape after substantial deformation by a weak stress and release of the stress". A thermoplastic elastomer is a material that combines the processability of a thermoplastic resin with the functional performance and properties of a conventional thermoset rubber. In general, any thermoplastic elastomer can be used to produce this type of netting. They are generally covered by the six resin classes listed below.

Thermoplastic Elastomer (TPE) Types

There are generally considered to be six classes of commercially available TPE'S:

Styrenic Block Copolymers (SBC's)

The various SBC's include:
Styrene-Butadiene-Styrene(SBS)
Styrene-Isoprene-Styrene(SIS)
Styrene-Ethylene/Butylene-Styrene (SEBS)
Styrene-Ethylene/Propylene-Styrene (SEPS) (uncommon) Tradenames and producers include Kraton (SBS, SIS and SEBS) by Shell Chemical Co., Finaprene (SBS) by Fina Oil & Chemical, and Europrene (SBS and SIS) by EniChem Elastomers. Only Shell makes the SEBS resin (Kraton G).

Thermoplastic Olefins and Blends (TPO's)

Tradenames and suppliers of traditional TPO's include Polytrope (a blend of polypropylene and EPDM, a rubber) by A. Schulman and Telcar (also a blend of polypropylene and EPDM) by Teknor Apex. These are propylene/EPDM block copolymers. EPDM is Ethylene Propylene Diene Monomer.

A new subclass of TPO's are the VLDPE's (very low density), copolymers with a density of about <0.880 g/cm$^3$. The elasticity of polyethylenes increases with decreasing density. Tradenames and suppliers of these include Exact by Exxon Chemical Co. and Engage by Dow Plastics.

Elastomeric Alloys

This class of TPE's consists of mixtures using two or more polymers that have received proprietary treatment to give them properties significantly superior to the simple blends of the same constituents. The two basic types are: Thermoplastic vulcanites (TPV's), such as Santoprene (polypropylene and crosslinked EPDM) by Advanced Elastomer Systems, Geolast (polypropylene or nitride rubber) by Monsanto and melt-processible rubbers (MPR's), such as Alcryn (polyvinylidene chloride and crosslinked polyvinylacetate copolymer) by Du Pont Co.

Thermoplastic Polyurethanes (TPU's)

Tradenames and suppliers include Pellethane (polyurethane with polyester, polyether, or polycaprolactone copolymers) by Dow Chemical and Estane by B.F. Goodrich.

Thermoplastic Copolyesters

Tradenames and producers include Hytrel (polyetherester copolymer) by Du Pont Co., and Arnitel (polyetherester copolymer) by DSM Engineering Plastics.

Thermoplastic Polyamides

Pebax (a block copolymer of polyamide and polyether) are made by Elf Atochem.

Various types of extruded netting may make use of the invention. For example, an extruded "square" netting that is extruded using either the "Hureau" process as aforenoted, yielding an all-elastomeric netting, or the "Bicomponent elastomeric netting" process as aforenoted, yielding either an all-elastomeric or a unidirectional elastomeric netting, or any other suitable netting process.

This extruded netting may then be uniaxially stretched in the machine direction in-line with the extruder, or biaxially stretched (essentially) using Larsen's process above noted, for example, to modify the properties of the net.

As already noted, extrusion of elastomeric nettings can often employ the same extrusion methods as those used for non-elastomeric nettings, i.e., orientable netting.

The three process steps of extrusion, MD stretch modification and TD stretch modification can be performed in two different ways:

1. Extrusion followed by MD and TD stretch at a biaxial orientor.
2. Extrusion followed by in-line MD stretch at ambient temperature with TD stretch at a (biaxial) orientor, such as that shown in the Larsen patent.

Extruded elastomeric nettings utilize thermoplastic elastomer resins as their raw material for at least some of the strands. This is possible as a result of the reversible crosslinking mechanism of thermoplastic elastomers. (Traditional rubber compounds, such as natural rubber, are vulcanized, resulting in non-reversible crosslinking.) This invention relates to extruded elastomeric netting, which in a secondary process step has been stretch modified. The combination of the use of thermoplastic elastomer resins and the stretch modification improves many of the netting's elastomeric properties and enhances other netting features. In particular, elastomeric nettings with:

lower set higher modulus higher force (at an equivalent elongation and weight)

lower energy loss (per hysterisis cycle)

lower product weight, and wider product width can be produced with this method.

Many thermoplastic elastomers are block copolymers, as already above identified, with hard and soft segments creating a crosslinked network. The crosslinked network configuration is somewhat random, but is also controlled by factors such as hard phase concentration and processing conditions. The first time a thermoplastic elastomer netting is stretched and relaxed (its first hysterisis cycle), some of these crosslinks are broken (probably due to an unfavorable physical arrangement). This results in a degree of permanent set from the first hysterisis cycle. In subsequent hysterisis cycles few additional crosslinks are broken as long as the netting is not stretched further than in the first hysterisis cycle. The effect is a lower set and lower energy loss in the second and subsequent hysterisis cycles, resulting in a product that performs much more like a true elastomer than the original product.

In the stretch modification process, the elastomeric netting goes through its first hysterisis cycle. It is stretched and relaxed, and the first cycle set is translated into a slightly wider width, increased roll length and a reduced MD and TD strand count. In the stretch modification process, the netting is typically stretched 100–400%. The resulting product performs best in applications where it is subjected to less than 100% elongation in use, as the netting will experience little additional set and energy loss in this range.

DETAILED DESCRIPTION OF THE INVENTION

Figure 1:
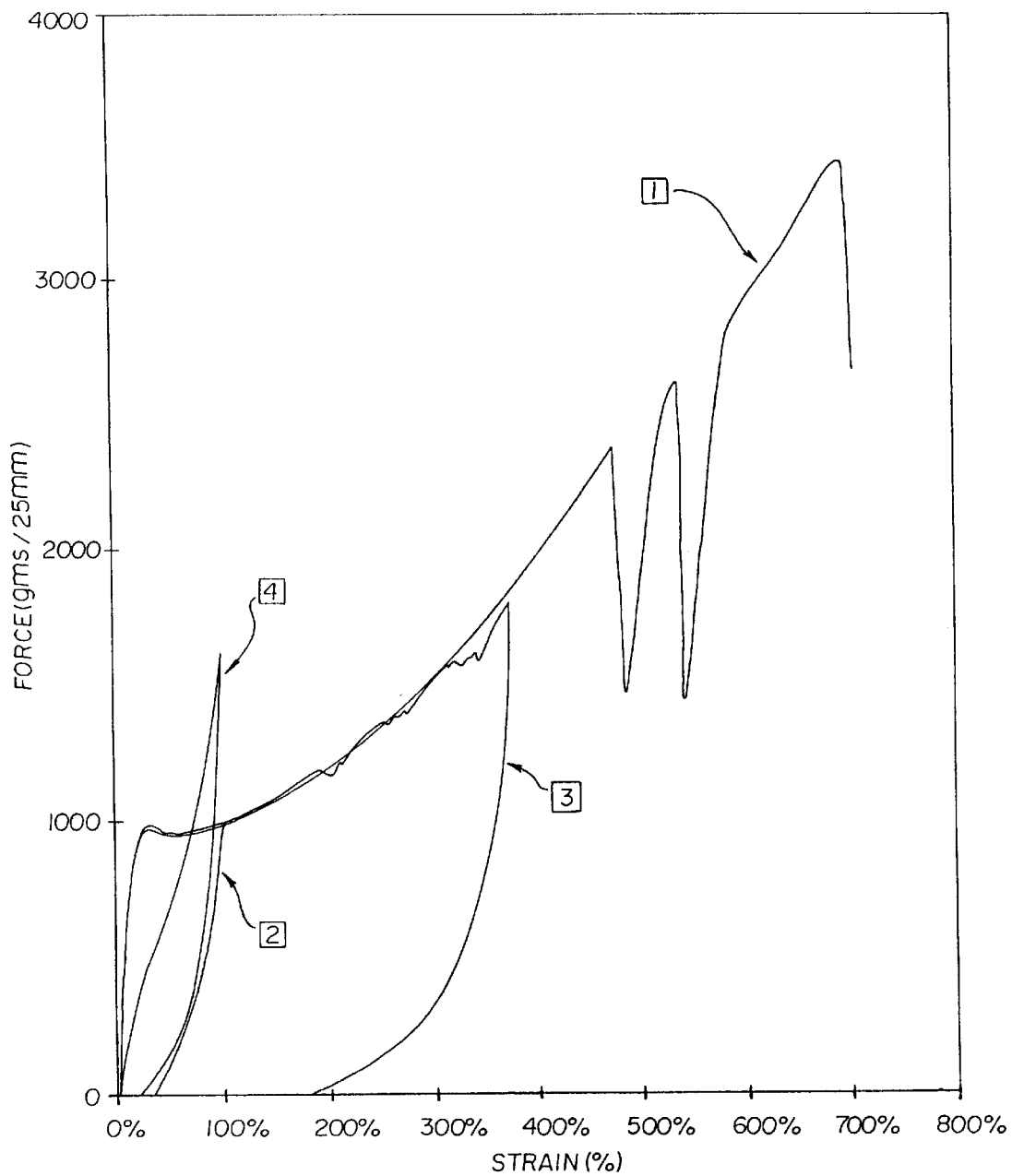
FIG. 1 is a graph showing stress-strain hysterisis curves for the transverse direction of a netting made with Hytrel 4056, a polyether-ester thermoplastic elastomer available from the Du Pont Company.

Stretch modified extruded elastomeric netting may be used in numerous ways. It may be used as a component in fabrics and other materials or used alone to create stretch and recovery in any direction required. It "bounces back" under vigorous use. It retains its elasticity to conform to a wide variety of shapes and sizes. For example, a preferred use of the netting at present is in mattress pads where it provides a tight fitting pad which does not come off at the corners. In such a pad, the structure is a layered or laminated structure of a "sandwich" type including the net interiorly.

Hysterisis stress-strain curves illustrate the elastomers modified according to the invention. By making use of the invention, i.e. stretch modification, resins and resin blends making up elastomeric netting or elastomeric/orientable netting hybrids can be custom engineered for different hysterisis requirements and product configuration.

Design Principles

Critical end use performance criteria (load force @ a specified elongation, unload force @ a specified elongation, set, stress relaxation, creep, strand count, etc.) must be known for custom engineering. Once these are established for a particular application, the following parameters must be taken into consideration.

Primary Design Parameters

Raw material: Thermoplastic elastomer (blend) selection

Netting weight

Processing:

Stretch modification ratio (i.e., stretch ratio)

Stretch modification temperature

Secondary Design Parameters

Processing:

Stretch rate

Holding time @ maximum elongation

MD line web tension

Line speed

Roll wind tension

Roll TD width when wound

The secondary design parameters affect the final netting properties, but to a much lesser extent than the primary design parameters do, and need not be considered further herein in any detail as they will be apparent to those familiar with this art.

Design Process

The selection of a thermoplastic elastomer resin forms the basis for the netting's performance characteristics. A library of hysterisis curves for various thermoplastic elastomer resins and resin blends is useful for product design but not necessary. Ideally, such hysterisis curves would be available at various stretch ratios and stretch temperatures. The netting weight may have to be adjusted to reach a specified force at a specified elongation (either on the load or unload cycle, or both). The stretching temperature can be increased to yield a greater first cycle set, improved dimensional stability and greater product width. The stretch ratio should generally exceed the stretch range expected in the netting's end use application. Specifically, the stretch ratio should be adjusted so that subsequent hysterisis cycles (at lower stretch rate for the end use application) meets specified predetermined performance targets. Often (but not always), the second load cycle follows closely the first cycle unload curve, this may serve as a first approximation in product design. Initial design targets may be established by simulating actual processing and end use conditions using a tensile tester capable of performing hysterisis testing. After initial product has been made and tested, the process will typically need to be fine-tuned. This can usually be done by a slight modification of the primary or secondary design parameters.

Referring now to FIG. 1, this graph contains stress-strain curves for the transverse direction of a netting made with Hytrel 4056, a polyether-ester thermoplastic elastomer, a block copolymer.

Curve #1 is the load curve to break. The two downward spikes are caused by strand slippage in the jaws of the testing machine.

Curve #2 shows the first hysterisis cycle to 100% elongation for the non-stretch modified netting.

Curve #3 shows the first hysterisis cycle to 375 % elongation for the non-stretch modified netting. This cycle is similar to what the netting experiences in the TD stretch modification process. The (return) set is 180%.

Curve #4 shows a second hysterisis cycle to 100% elongation, that follows the first cycle to 375% (Curve #3). Curve #4 has been repositioned, so that it starts @ 0% strain, rather than @ 180% strain. Curve #4 simulates the first hysterisis cycle in the end use application of the stretch modified product. When comparing the stretched product (curve #4) to the non-stretched product (curve #2), it can be seen that in this case the stretched product has:

lower set (18% vs 35%)

higher modulus (in this example, this only applies to the 20–100% elongation range)

lower energy loss higher force (in this example, this only applies to the 75–100% elongation range)

than the non-stretched product. It is also a slightly wider, lower weight product.

Note that if curve #4 would have started at 180% strain, it would have extended out to 360% strain (for 100% elongation when starting the second cycle at 0% strain). Also note that with this medium hardness resin, the first cycle's load curve shows a definite yield point. This yield point is eliminated in the second cycle, and therefore also for a stretch modified elastomeric netting.

Figure 2A:
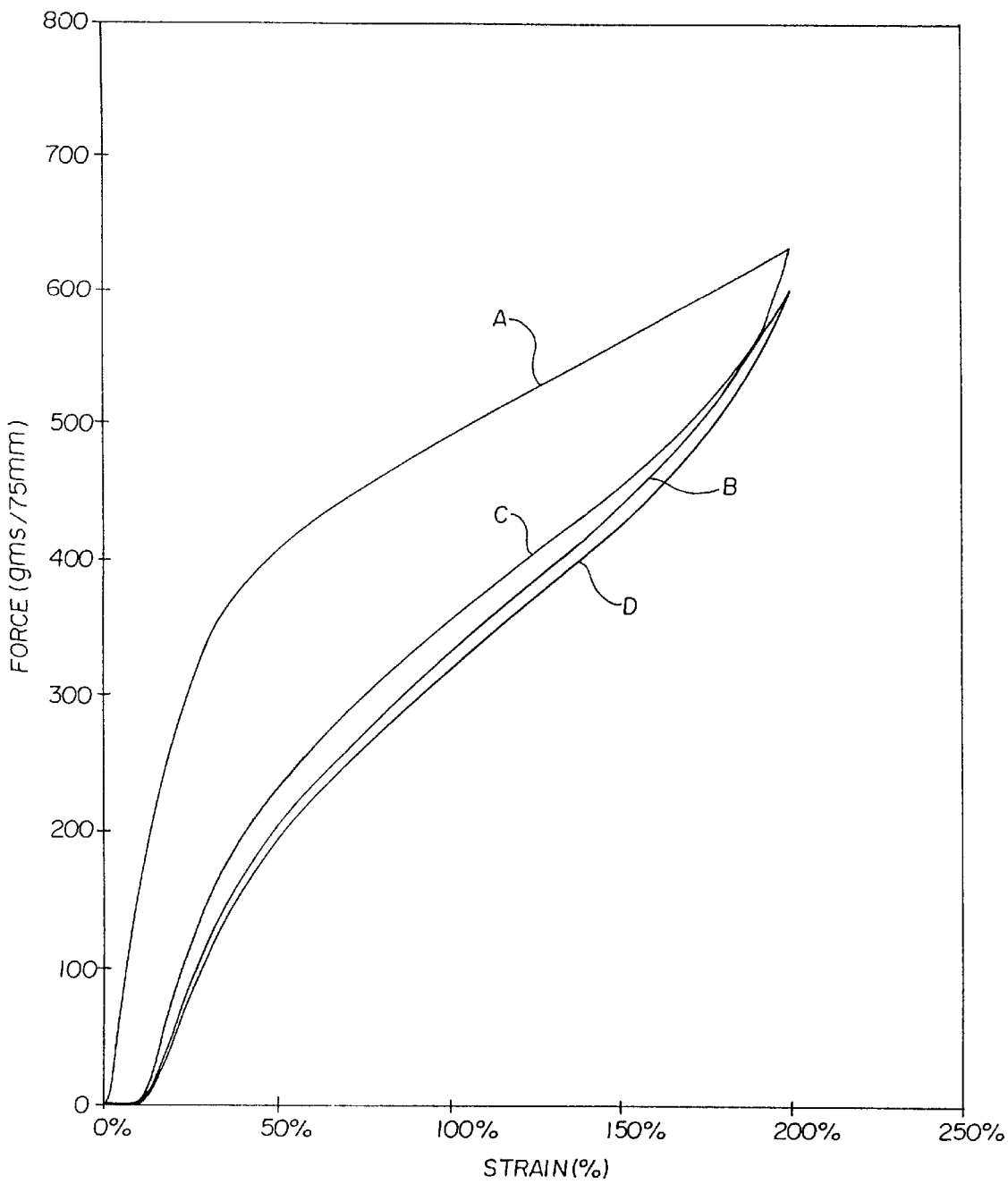
FIGS. 2A and 2B show two and four cycle stress-strain hysterisis curves of a netting made with a blend of styrene-butadiene-styrene block copolymer (SBS) resins (65/25/10: Vector 7400/Vector 8550/Styron 666D, Vector being from Dexco polymer and Styron being from Dow).
Figure 2B:
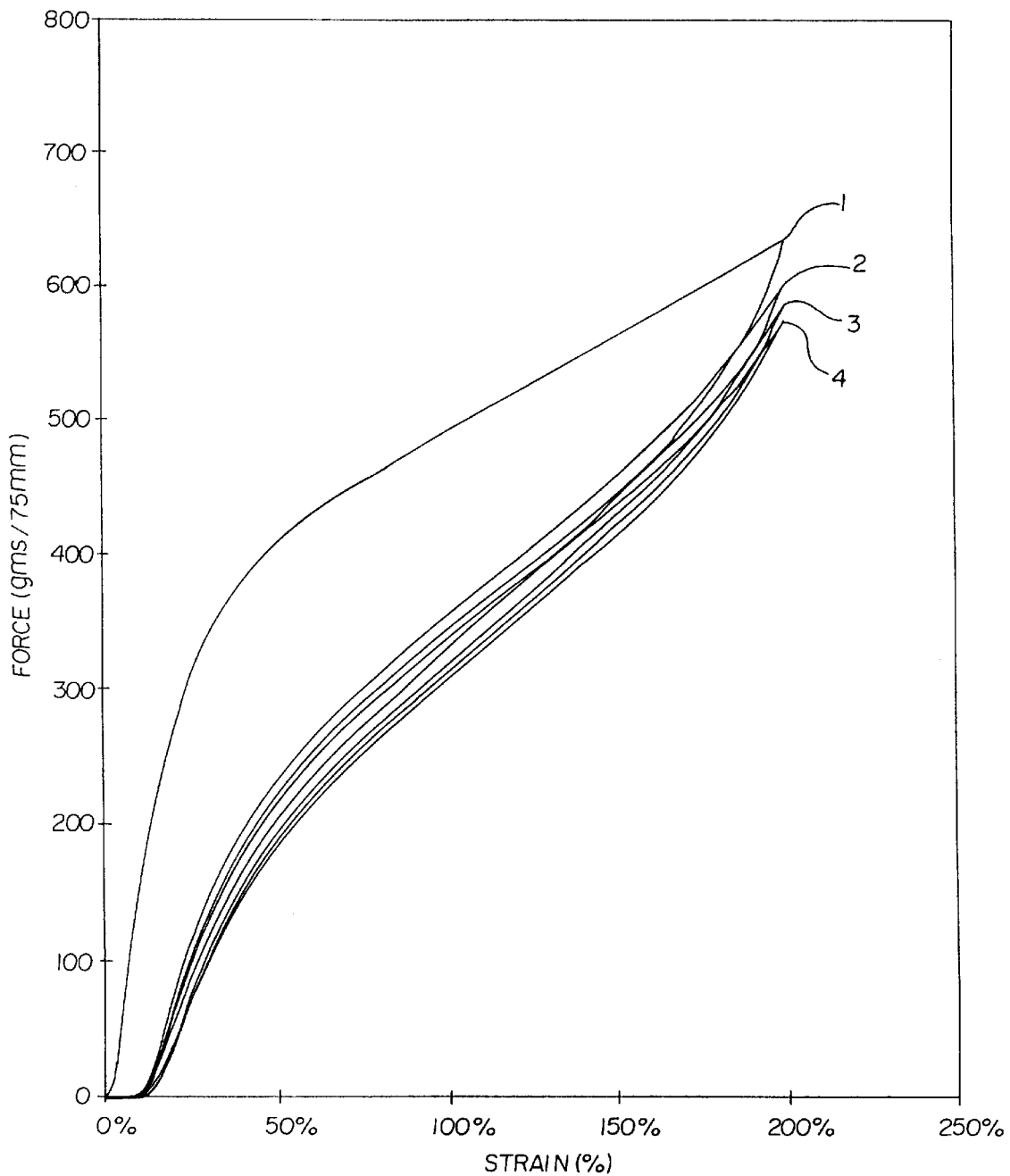

Referring now to FIGS. 2A and 2B, these two graphs show two (2A) and four (2B) cycle hysterisis curves of a netting made with a blend of styrene-butadiene-styrene (SBS) resins. Compared to the netting in FIG. 1, this netting is relatively soft (low hardness), has a low force, low modulus, low set, and low energy loss. FIGS. 2A and 2B show that subsequent hysterisis cycles approximately follow the first cycle unload curve. The additional set (after the first cycle) is minimal. Most of the energy loss takes place in the first hysterisis cycle. When this product is stretched, very little additional width is gained, but set and energy loss are reduced and close to zero.

Referring now to FIG. 2A, it includes several curves A, B, C and D. Curve A represents a first loadcycle applied to an all elastomeric net in the MD direction in which stretch modification occurs. Curve B represents a first unload cycle in which the load applied in Curve A is relaxed and released. Curve C represents a second load cycle which is representative of load in actual use of the product. Curve D represents a second unload cycle in which the load of Curve C is relaxed and released.

It can be readily seen from the graph that curves A and B, the first cycle, show some "set" but it is low compared to that obtained with orientable polymer nets. In subsequent cycles (C–D) there is low set which does not significantly increase the original "set" or there is low additional set.

Also, it can be seen that the energy loss takes place primarily in the first cycle (A–B) with very little loss occurring in subsequent cycles.

The combination of low energy loss and low set makes this a product that performs very close to a true elastomer.

Referring now to FIG. 2B, it also includes several curves 1–4 similar to those in FIG. 2A. Curve 1 shows first hysterisis cycle (both load and unload). Curve 2 shows a second hysterisis cycle (both load and unload). Curve 3 shows a third hysterisis cycle (both load and unload). Curve 4 shows a fourth hysterisis cycle (both load and unload).

All hysterisis cycles include an upper curve (load cycle) and a lower curve (unload cycle). What is demonstrated by the curves of FIG. 2B is that subsequent cycles after the first cycle do not result in significant changes in the set and energy loss properties.

Comparison of Low and Medium Hardness Stretch Modified Elastomeric Netting

The performance difference between a netting made from Hytrel 4056 (a medium hardness thermoplastic elastomer, FIG. 1), and the netting made from the SBS blend (a low hardness thermoplastic elastomer, FIGS. 2A and 2B) show a typical performance range for resins used for stretch modified elastomeric netting. Within the same resin class:

The harder the resin, the higher the set, and the greater the width gained with the stretch modified elastomeric netting.

The harder the resin, the higher the modulus and force. A stretch modified elastomeric netting will increase the modulus and force (at equivalent elongation) further yet.

The softer the resin, the lower the energy loss. A stretch modified elastomeric netting will reduce the energy loss further yet when not exceeding the original stretch modification or first cycle elongation.

EXAMPLES

Example #1

The starting product is an extruded, square, all-elastomeric netting made from Hytrel 4056. Hytrel 4056 is a polyether-ester resin made by Du Pont. The netting is biaxially stretched using equipment similar to that described in U.S. Pat. No. 4,152,479 (Larsen). The product is stretched in the machine direction ("drafted") at a temperature of 128° F., and an applied MD stretch ratio of 2.52. The resulting effective MD stretch ratio (after full product relaxation) is 1.79. The product is then stretched in the cross direction ("tentered") at a temperature of 150° F., and an applied CD stretch ratio of 4.75. The resulting effective CD stretch ratio is 2.38. Cf. Example 1 in Table 1 below.

Table 1 below includes data for Example 1 and for additional sets of stretch modification trials, containing information for additional Examples 2 and 3.

POLYETHER-ESTER COPOLYMER/TABLE 1

| Product Description | Ex. #1 Biaxially stretched product | Ex. #2 Biaxially Biaxially product | Ex #3 MD Stretched-only product. |
|---|---|---|---|
| Resin | Hytrel 4056 | Hytrel 3078 | Hytrel 4056 |
| Relaxed strandcount, MD × TD (per inch) | 2.8 × 2.8 (on roll: 2.5 × 2.8) | 2.7 × 3.6 | 6.8 × 2.6 |
| Calculated relaxed weight (PMSF) | 6.7 (on roll: 5.8) | 6.6 | 16.3 |
| Relaxed width, excluding edgetrim (in) | 30.4 (on roll: 35.0) | 31.5 | 32.9 |
| Applied/Effective draft ratio | 2.52/1.79 | 3.35/1.68 | 3.21/1.92 |
| Applied Effective tenter ratio | 4.75/2.38 (on roll: 2.74) | 4.83/2.10 | — |
| MD stretch temperature (° F.) | 128 | 70 | 90 |
| TD stretch temperature (° F.) | 150 | 146 | — |
| MD set @ 35% elongation (%) | 5.5 | 1.7 (est.) | 4.0 |
| MD force @ 35% elongation (g/3 in) | 1,600 | 210 (est.) | 4,220 |
| MD force @ break (g/3 in) | 10,300 | | 28,600 |
| TD force @ break (g/3 in) | 3,030 | | 2,500 |
| MD elongation @ break (%) | 450 | | 440 |
| TD elongation @ break (%) | 220 | | 720 |

Example #5

This all-elastomeric extruded "square" netting is made from Hytrel 3078. Hytrel 3078 is a polyether-ester resin made by Du Pont Company. The netting is first MD stretch modified in-line with the extrusion process, and subsequently CD stretch modified using part of a biaxial orientor (as in Example #1). The product is stretched in the machine direction at room temperature (70° F.), and an applied MD stretch ratio of 3.61. The resulting effective MD stretch ratio after full product relaxation is 1.67. The product is stretch modified in the CD at room temperature (70° F.), and an applied CD stretch ratio of 5.29. The resulting Effective CD stretch ratio is 1.93. Cf. Example 5 in Table 2 below. Table 2 not only includes data for Example #5 but for additional stretch modification trials regarding Examples 4–9.

POLYETHER-ESTER COPOLYMER/TABLE 2

| Product description | Ex. #4 -CD stretch-only product | Ex. #5 - Biaxially stretch product.(1) | Ex. #6 - CD stretch -only product | Ex. #7 - CD stretch- only product | Ex. #8 - Biaxially stretched product.(2) | Ex. #9 - Biaxially stretched product.(2) |
|---|---|---|---|---|---|---|
| Resin | Hytrel 3078 | Hytrel 3078 | Hytrel 3078 | Hytrel 3078 | Hytrel 3078 | Hytrel 3078 |
| Relaxed strand count, MD × TD (per inch) | 3.0 × 6.2 | 2.9 × 3.7 | 2.5 × 6.1 | 2.6 × 5.1 | 2.6 × 3.1 | 2.7 × 3.6 |
| Calculated relaxed weight (PMSF) | 12.6 | 7.2 | 10.1 | 9.0 | 5.5 | 6.6 |
| Relaxed width, (in) | 26.3 | 27.0 | 32.0 | 32.4 | 32.5 | 31.5 |
| Applied/Effective MD stretch ratio | 1.00/0.98 | 3.61/1.67 | 1.00/1.00 | 1.00/1.19 | 3.20/1.96 | 3.35/1.68 |
| Applied/Effective CD stretch ratio | 5.29/1.88 | 5.29/1.93 | 5.29/2.29 | 4.83/2.16 | 4.83/2.17 | 4.83/2.10 |
| MD Stretch Temperature (° F.) | — | 70 | — | — | 70 | 70 |
| CD stretch temperature (° F.) | 70 | 70 | 153 | 150 | 147 | 146 |
| MD set @ 25%–50%–75%–100% elongation (%) | | 0.7–3.1–6.0–8.7 | | | 0.9–3.1–5.2–7.0 | 0.9–2.9–4.8–6.7 |
| TD set @ 25%–50%–75%–100% elongation (%) | | 0.6–2.7–5.2–7.8 | | | 0.5–2.6–5.0–7.4 | 0.9–2.9–5.3–7.8 |
| MD elastic recovery ration for 25%–50%–75%–100% elongation | | 1.0–1.2–1.4–1.5 | | | 1.0–1.2–1.3–1.4 | 1.0–1.1–1.2–1.3 |
| TD elastic recovery ratio for 25%–50%–75% 100% elongation | | 1.0–1.1–1.3–1.4 | | | 1.0–1.1–1.3–1.4 | 1.0–1.1–1.3–1.4 |

-continued

POLYETHER-ESTER COPOLYMER/TABLE 2

| Product description | Ex. #4 -CD stretch-only product | Ex. #5 - Biaxially stretch product.(1) | Ex. #6 - CD stretch -only product | Ex. #7 - CD stretch-only product | Ex. #8 - Biaxially stretched product.(2) | Ex. #9 - Biaxially stretched product.(2) |
|---|---|---|---|---|---|---|
| MD force @ 25%–50%–75%–100% elongation (g/2 in) | | 190–330 440–550 | | | 120–210–300–480 | 110–190–290–240– |
| TD force @ 25%–50%–75%–100% elongation (g/2 in) | | 280–490–670–830 | | | 210–360 480–630 | 170–290–400–510 |
| MD stress relaxation, 5 min @ 50% elongation (%) | | | | | | 15.1 |
| TD stress relaxation, 5 min. @ 50% elongation (%) | | | | | | 15.5 |

Example #12

This all-elsatomeric extruded "square" netting is made from Exact 4041, a VLDPE copolymer resin made by Exxon. The netting is MD stretch modified in-line with the extrusion process, and subsequently CD stretch modified using part of a biaxial orientor (as in Example #1). The product is stretched in the MD at room temperature and an applied MD stretch ratio of 2.11. The resulting effective MD stretch ratio after full product relaxation is 1.58. The product is stretch modified in the CD at 130° F., and an applied CD stretch ratio of 3.49. The resulting effective CD stretch ratio is 2.37. Cf Example #12 in Table 3 below. Table 3 not only includes data for Example #12 but for additional stretch modification trials regarding Examples 10–15.

VLDPE COPOLYMER TABLE 3

| Product description | Ex. #10 - CD stretch-only product | Ex. #11 - Biaxially stretch product. | Ex. #12 - Biaxially stretch product. | Ex. #13 - Biaxially stretch product. | Ex. #14 - Biaxially stretched product. | Ex. #15 Tenter-ed-only |
|---|---|---|---|---|---|---|
| Resin | Exact 4041 | Exact 4041 | Exact 4041 | Exact 4041 | Exact 4041 | Exact 4041 |
| Relaxed strandcount, MD × TD (per inch) | 3.7 × 3.4 | 3.5 × 3.6 | 3.6 × 3.4 | 5.3 × 4.2 | 4.9 × 4.3 | 4.7 × 5.1 |
| Calculated relaxed weight (PMSF) | 5.7 | 6.0 | 5.7 | 5.6 | 5.3 | 6.0 |
| Relaxed width, (in) | 88.6 | 91.3 | 92.5 | 88.3 | 93.4 | 97.8 |
| Finished slit roll width (in) | 102 | 95 | 95 | 95 | 95 | |
| Applied/Effective MD stretch ratio | 100/1.23 | 2.11 1.47 | 2.11/1.58 | 2.14 2.03 | 2.14/1.68 | 1.00/1.02 |
| Applied/Effective CD stretch ratio | 3.53/2.30 | 3.58/2.40 | 3.49/2.37 | 3.49/2.26 | 3.56/2.44 | 3.57/2.57 |
| Tenter temperature, (° F.) | 121 | 127 | 130 | 131 | 134 | 135 |
| MD set @ 25%–50%–75%–100% elongation (%) | 1.3–4.6–9.6–17 | 1.8–5.7–11–19 | 1.7–5.3–11–18 | 1.7–5.3–11–19 | 1.6–5.1–9.8–18 | 1.3–5.0–11–21 |
| TD set @ 25%–50%–75%–100% elongation (%) | 2.1–6.5–11–18 | 2.8–7.2–12–19 | 2.2–6.2–11–18 | 2.0–5.8–11–17 | 2.1–6.2–11–19 | 1.7–5.1–9.7–17 |
| recovery ratio for 25%–50%–75%–100% elongation | 1.5–1.8 | 2.0 | 1.9 | 2.0 | 1.7–1.9 | 1.2–1.3 |
| recovery ratio for 25%–50%–75%–100% elongation | 1.6–1.8 | 1.8 | 1.9 | 1.8 | 1.6–1.9 | 1.6–1.9 |
| MD force @ 25%–50%–75%–100% elongation (g/2 in) | 290–390–450–500 | 350–460–510–570 | 410–570–660–730 | 460–630–730–820 | 410–560–650–730 | 270–340–390–420 |
| TD force @ 25%–50%–75%–100% elongation (g/2 in) | 190–290–410–550 | 150–240–340–450 | 190–310–440–750 | 140–220–320–440 | 160–250–370–490 | 170–280–400–510 |

Figure 3:
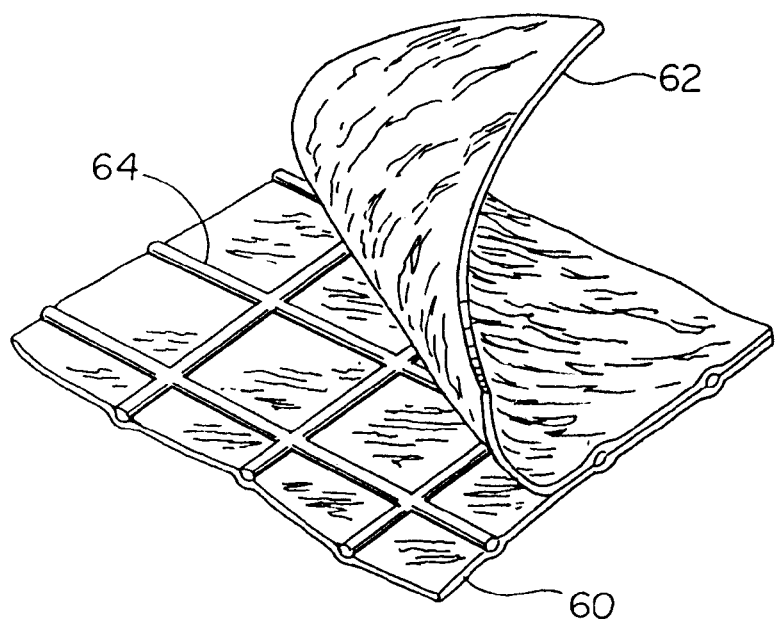
FIG. 3 is a pictorial view of a form of the netting according to the invention used as a reinforcing/elastic element in a multi-layer composite material or fabric.

The invention finds a preferred use in composite materials comprised of multi-layers such as that shown in FIG. 3. Two layer composites of net and another material may be used but composites with more than two layers such as shown in the FIG. 3 are most likely. That composite comprises outer covering layers 60 and 62, the stretch conditioned elastomer net being indicated at 64. All such composites are referred to herein generally as composites comprised of a plurality of layers including net. They may be manufactured in the known manner as by subjecting them, when assembled, to heat and pressure. Adhesives may be included.

The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is as follows:

1. The method of modifying elastic properties of extruded net containing elastomeric strands, comprising:

providing extruded net having extruded strands, at least some of which are elastomeric strands;

selecting end use performance criteria for desired final elastic properties for the elastomeric material making up the elastomeric strands in the net;

determining, based on hysteresis performance data, the stretch conditions necessary to achieve the desired final properties, and stretching the elastomeric strands under the determined conditions to achieve the desired final properties in the elastomeric strands.

2. The method of claim 1 carried out at room temperature.

3. The method of claim 1 carried out at elevated temperatures.

* * * * *